Dec. 7, 1943.   J. P. SHUHI   2,336,194
AIRPLANE
Filed July 9, 1942   3 Sheets-Sheet 1
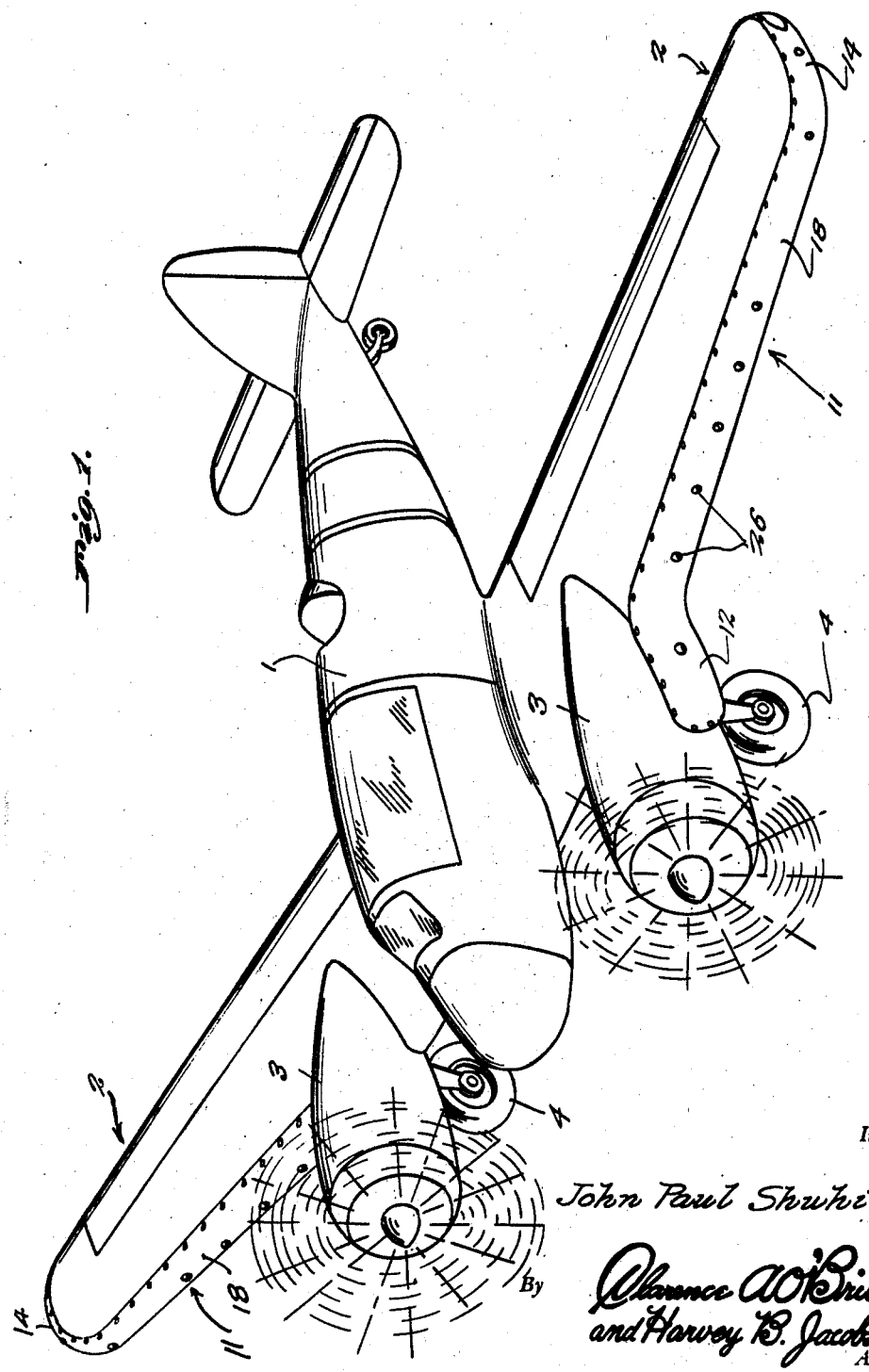
Inventor
John Paul Shuhi
By Clarence A. O'Brien
and Harvey B. Jacobson
Attorneys Dec. 7, 1943.   J. P. SHUHI   2,336,194
AIRPLANE
Filed July 9, 1942   3 Sheets-Sheet 2
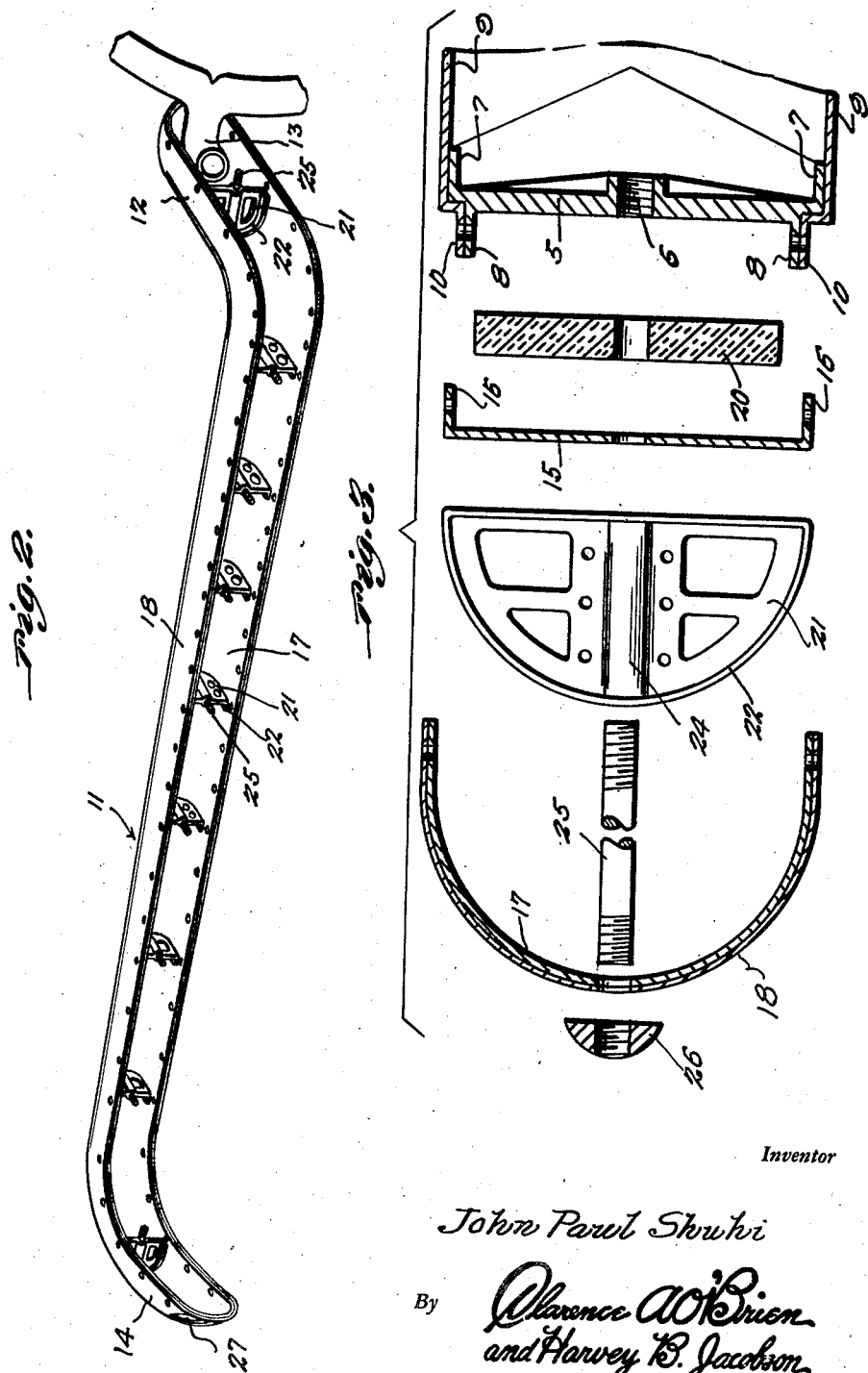
Inventor
John Paul Shuhi
By Clarence A. O'Brien
and Harvey B. Jacobson
Attorneys Dec. 7, 1943.  J. P. SHUHI  2,336,194
AIRPLANE
Filed July 9, 1942  3 Sheets-Sheet 3
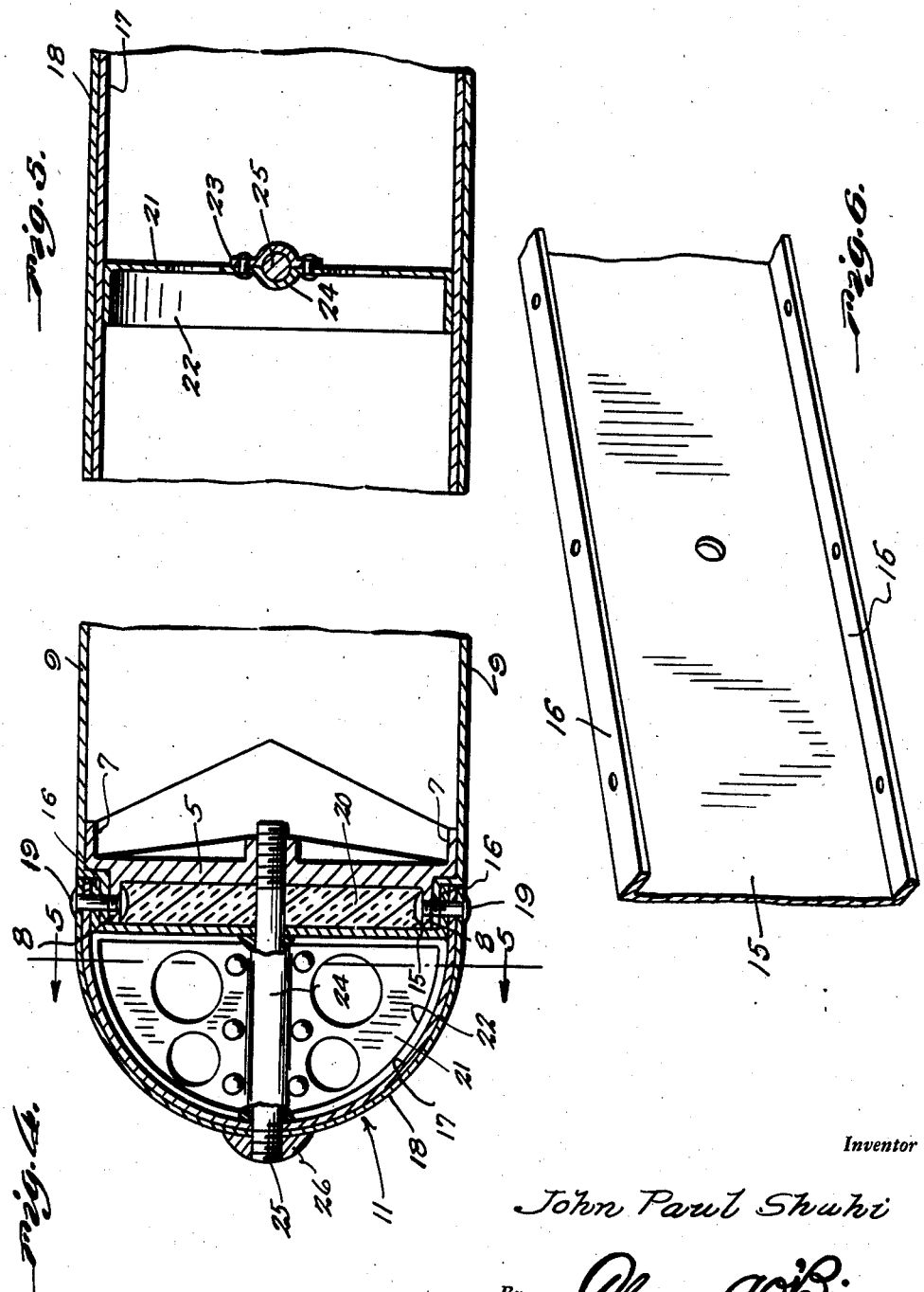
Inventor
John Paul Shuhi
By Clarence A. O'Brien
and Harvey B. Jacobson
Attorneys Patented Dec. 7, 1943

2,336,194

UNITED STATES PATENT OFFICE 2,336,194

AIRPLANE

John Paul Shuhi, Litchfield, Conn., assignor of one-half to Adolph Wendt, Torrington, Conn.

Application July 9, 1942, Serial No. 450,313

2 Claims. (Cl. 244—134)

The present invention relates generally to new and useful improvements in airplanes, and has for its primary object to provide, in a manner as hereinafter set forth, a vehicle of this character comprising wings having incorporated therein a novel construction and arrangement for silencing or muffling the engine exhaust.

Another very important object of the invention is to provide an airplane of the aforementioned character wherein the engine exhaust gases are utilized for heating the wings in a manner to prevent the formation of ice thereon, particularly the leading edges and adjacent portions.

Still another very important object of the invention is to provide an airplane of the character described wherein the silencing and heating structure, which constitutes the leading edges of the wings, may be expeditiously removed when desired to facilitate the making of repairs or for other reasons.

Other objects of the invention are to provide an airplane of the character described which will be comparatively simple in construction, strong, durable, light in weight, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a perspective view of a twin engined airplane embodying the present invention.

Figure 2 is a perspective view of the muffler structure, showing same removed from the wing.

Figure 3 is a cross sectional view through the leading edge of a wing constructed in accordance with the present invention, showing the members separated.

Figure 4 is a cross sectional view through the leading edge of a wing, showing the parts assembled.

Figure 5 is a fragmentary view in longitudinal section, taken substantially on the line 5—5 of Figure 4.

Figure 6 is a perspective view of a portion of the back plate of the muffler.

Referring now to the drawings in detail, it will be seen that the embodiment of the invention which has been illustrated comprises a suitable conventional fuselage 1, wings 2 from which engine nacelles 3 project forwardly, landing wheels 4, et cetera.

The forward portions and tips of the wings 2 comprise metallic beams 5 having threaded openings 6 at spaced points therein. The beams 5 further include, on their longitudinal edges, rearwardly extending flanges 7 and inwardly offset, apertured front flanges 8. The skin portions 9 of the wings 2 rest on the flanges 7 and comprise inwardly offset front marginal portions or flanges 10 which rest on the flanges 8. Thus, the skins 9 and the beams 5 are interlocked.

Mounted on the fronts of the beams 5 are shells 11 constituting mufflers. The shells 11 also constitute the leading edges of the wings 2. The shells 11 include inner end portions 12 which extend forwardly on the engine nacelles 3 for communication with the exhaust manifolds 13 of the power plants of the craft. The shells 11 further comprise outer end portions 14 which extend rearwardly around the tips of the wings 2.

Referring now to Figures 3 and 4 of the drawings, it will be observed that the shells 11 still further include metallic plates 15 having apertured marginal flanges 16 which overlie the skin flanges 10. Mounted on the plates 15 are metallic casings 17 of substantially U-shaped cross section having apertured longitudinal marginal portions which overlie the flanges 16. The members 15 and 17 are preferably of suitable heat resisting material. Covers 18 of suitable weather resisting material are provided for the casings 17. Suitable securing elements 19 fasten the members 5 to 18, inclusive, together.

The members 5 and 15 define a chamber in which a heat insulating element 20 is placed. Metallic baffles 21 are mounted at spaced points in the shells 17, said baffles comprising marginal flanges 22. The baffles 21 have mounted thereon plates 23 and are formed to provide, in conjunction therewith, eyes 24 for the passage of bolts 25. The bolts 25 are inserted through the elements 18, 17, 24, 15 and 20, and are threaded into the openings 6 which are provided therefor in the beams 5. Nuts 26 are threaded on the forward end portions of the bolts 25.

It is thought that the manner in which the invention functions will be readily apparent from a consideration of the foregoing. Briefly, the exhaust gases from the power plants of the airplane enter the inner end portions 12 of the shells 11 from the exhaust manifolds 13. These exhaust gases flow through the shells 11, passing through the apertured baffles 21 and discharging to the atmosphere at the outer ends of the shells 11, as at 27. In this manner the power plants of the airplane are muffled. As hereinbefore stated, the muffler structures also constitute the leading edges of the wings 2. Thus, the engine exhaust gases are utilized for heating the leading edges and preventing the formation of ice or sleet thereon. Still further, the construction and arrangement is such as to materially strengthen the wings.

It is believed that the many advantages of an airplane embodying the present invention will be readily understood, and although a preferred form is as illustrated and described, it is to be understood that changes in the details of construction and in the combination and arrangement of parts may be resorted to which will fall within the scope of the invention as claimed.

What is claimed is:

1. An airplane wing comprising skin portions, a beam in the front portion of the wing, said beam including rearwardly extending flanges engaged with the skin portions and further including inwardly offset front flanges, the skin portions comprising inwardly offset flanges engaged with the second-named flanges, a plate mounted forwardly of the beam in spaced relation thereto and including flanges resting on the skin flanges, a heat insulating element between the beam and the plate, a shell of substantially semi-circular cross section mounted on the plate and defining, in conjunction therewith, a muffler chamber for receiving exhaust gases from an engine of the airplane, said shell including apertured marginal portions extending over the plate flanges, elements securing the second, third and fourth-named flanges and the shell together, and apertured baffles mounted at spaced points in the shell.

2. An airplane comprising a wing including a beam in its front portion, said wing further including skin portions secured to said beam, a plate mounted forwardly of the beam in spaced relation thereto, a heat insulating element mounted between the beam and the plate, a shell of substantially semi-circular cross section mounted on the plate, a cover on said shell, apertured partitions mounted at spaced points in the shell, said partitions including eyes, bolts extending through the cover, the shell, the eyes, the plate, the heat insulating element and threaded into the beam, and retaining nuts threaded on the outer end portions of said bolts.

JOHN PAUL SHUHI.